United States Patent Office 3,095,384
Patented June 25, 1963

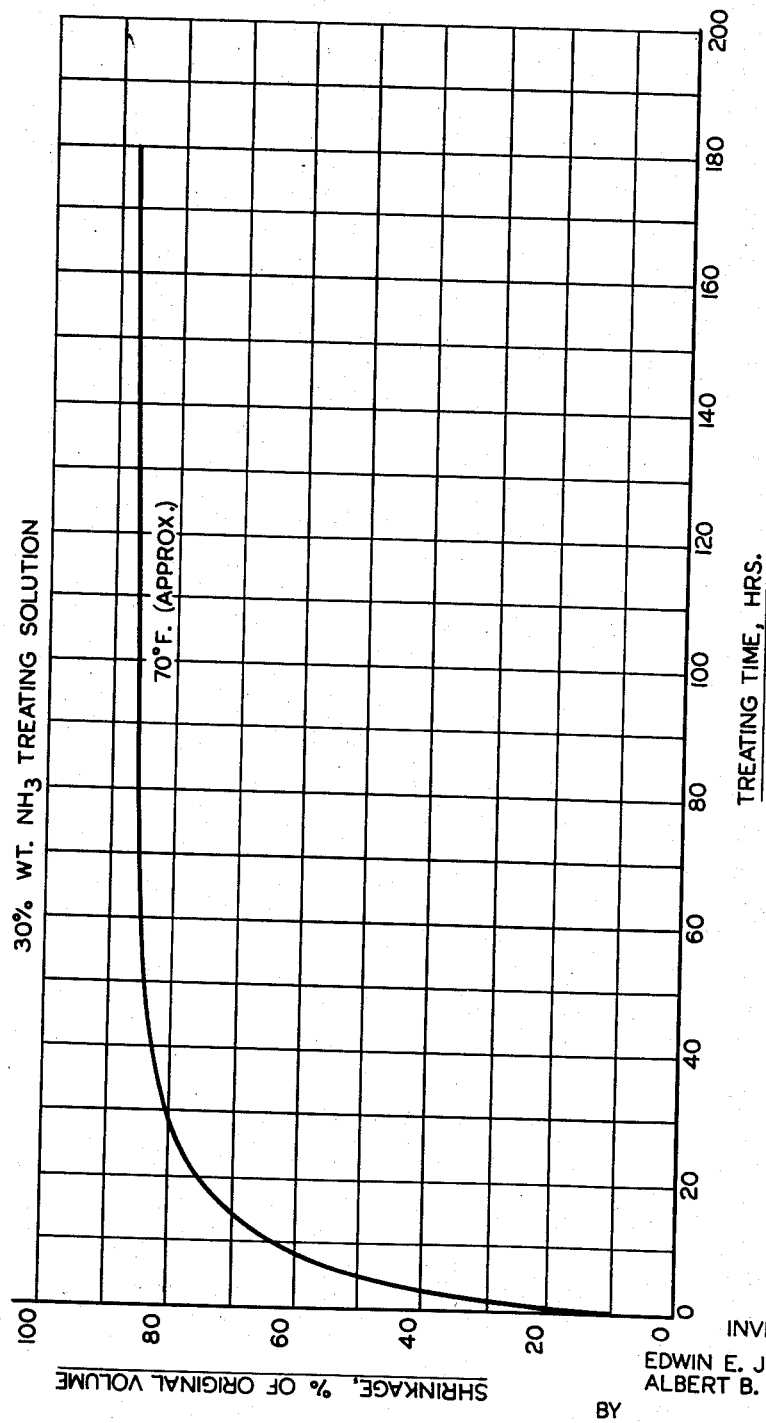

3,095,384
HYDROGEL TREATMENT
Edwin E. Jenkins, Elmer, N.J., and Albert B. Schwartz, Philadelphia, Pa., assignors to Socony Mobil Oil Company, Inc., a corporation of New York
Filed Sept. 9, 1960, Ser. No. 55,012
7 Claims. (Cl. 252—451)

This invention relates to a method of treating a siliceous hydrogel under particularly defined conditions with a concentrated ammonia-containing fluid to effect dehydration of the hydrogel. More particularly, this invention relates to treatment of a siliceous hydrogel with a concentrated ammonia-containing fluid, e.g. an aqueous ammonium hydroxide solution containing at least 10 percent ammonia by weight, to partially dehydrate the hydrogel and thereby considerably decrease the gel volume.

Siliceous materials offer considerable applicability in petroleum technology. For example, such materials exhibit particular utility as catalysts, catalyst supports, adsorbents, etc.

As is well known, there are numerous materials, both of natural and synthetic origin, which have the ability to catalyze the cracking of hydrocarbons. Typical of the present commercially available catalysts are the silica catalysts, e.g. catalysts consisting of silica as well as silica-metal oxide composite catalysts such as silica-alumina, silica-magnesia, silica-zirconia, silica-alumina-magnesia, silica-zirconia-alumina, etc. Such catalysts are prepared by any of a number of conventional methods, one common method being to neutralize an alkaline silicate solution with an acid to form a hydrosol, permitting the hydrosol to set to a hydrogel, washing, drying, and calcining the gel.

Modern catalytic cracking processes require strong catalysts, i.e. catalysts that are hard and hence attrition resistant. The ability of a catalyst particle to hold its shape and withstand the mechanical handling to which it is subjected is an important requirement. Thus, catalytic cracking operations are generally carried out in the presence of a solid porous silica type catalyst, and such operations usually subject the catalyst to continuous handling. For instance, a continuously moving stream of hydrocarbon feed is contacted with a continuously moving stream of catalyst in order to secure the hydrocarbon conversion, and thereafter the catalytic material is continuously regenerated and returned to the conversion zone. Such continuous handling and regeneration of the catalyst particles results in constant abrasion. A hard porous cracking catalyst having the ability to withstand this abrasion is accordingly highly desirable.

It is also desirable that such a catalytic material have a high pore volume and large pores in order to avoid diffusion limitations in catalytic reactions.

The amount and size of equipment required to process the gel is another important factor. In general, the greater the solids concentration and the smaller the volume of the hydrogel, the smaller the size of the equipment required to process the gel. Thus, a hydrogel that has been partially dehydrated prior to drying renders the subsequent drying thereof that much easier, because the amount of water to be vaporized therefrom is correspondingly less.

Accordingly, it is an object of our invention to provide a method of treating a siliceous hydrogel to partially dehydrate the same and thereby obtain a considerable shrinkage in the gel volume.

Another object is to provide a method of partially dehydrating a siliceous hydrogel and reducing the gel volume, so that the resulting hydrogel exhibits unusual strength and resistance to breaking, and which after washing, drying and calcining, results in a gel having a much greater resistance to breaking in water than conventionally prepared siliceous hydrogels.

A further object is to provide a method of treating a hydrogel to ultimately obtain a dried product having a very high pore volume and large pores, this product having applicability as a catalyst, adsorbent, or catalyst support.

Additional objects will become apparent hereinafter.

Our invention will be more fully understood by reference to the accompanying drawing which is a graph showing the effect of time of treatment upon the volume shrinkage of a siliceous hydrogel.

In accordance with one aspect of our invention, a siliceous hydrogel is treated with a strong aqueous solution of ammonium hydroxide under particularly defined conditions of concentration, temperature, and time, to partially dehydrate and appreciably shrink the overall volume of the hydrogel.

When a siliceous hydrogel is treated with a highly concentrated aqueous solution of ammonium hydroxide, i.e. a solution containing at least 10 percent by weight $NH_3$ and preferably even higher, a very considerable shrinkage in hydrogel volume results, e.g. of the order of 50% volume reduction or greater. This is most unexpected because, as is illustrated hereinafter (Examples 24–27), the use of a somewhat less concentrated $NH_4OH$ solution, say 5% $NH_3$ by weight, results in very little shrinkage of the hydrogel, i.e. generally less than ten percent.

To achieve a high reduction in volume of the hydrogel it is necessary that the concentration of the ammonium hydroxide solution be from about 10% $NH_3$ by weight up to saturation. In general, the higher the concentration of $NH_3$, the greater the shrinkage of the hydrogel and the higher its density. A preferred solution concentration range is from about 20 weight percent ammonia to saturation. Of course, the saturation concentration will vary, depending upon the particular pressure and temperature employed. For example, at atmospheric pressure and at 70° F. the saturation concentration of ammonia is about 32 weight percent $NH_3$.

In accordance with another aspect of our invention, the ammonium hydroxide solution may be blanketed with an ammonia-containing gas and maintained under pressure to maximize the $NH_3$ concentration in the solution. The pressure may be from about zero to 500 pounds per square inch.

In accordance with yet another aspect of our invention the hydrogel, which ordinarily is about 90 percent aqueous phase, may be continuously treated solely with ammonia gas, e.g. either with pure gaseous ammonia or an ammonia-containing gaseous mixture such as ammonia-air, ammonia-nitrogen, etc. In order to obtain a high degree of shrinkage of the hydrogel, the amount of ammonia present in the gas, the time of contact of the gas with the hydrogel, and the rate of gas flow are adjusted such that the ultimate concentration of ammonia in the aqueous phase of the hydrogel is at least 10 percent by weight.

The time of treatment of the hydrogel with the ammonia-containing fluid may vary within rather wide limits, depending upon both the concentration and the temperature of the treating solution, i.e. from one-half an hour up to 100 hours or longer. A preferred range for treating time is from about two to 100 hours. In general, the higher the concentration and/or temperature of the solution, the less treating time required.

The treatment may be carried out at temperatures from about 30° F. up to the boiling point of the solution. Higher temperatures will accelerate the shrinkage, however excessive loss of ammonia may occur unless a closed treating system is used. Where the system is blanketed with an ammonia-containing gas under a positive pressure of about 500 pounds per square inch, the temperature may be maintained at about 350° F.

The method of our invention is applicable to a wide variety of siliceous hydrogels, including silica hydrogel and also silica-metal oxide composite hydrogels such as silica-alumina, silica-magnesia, silica-zirconia, silica-alumina-zirconia, silica-alumina-magnesia, silica-alumina-chromia and the like. As will be seen hereinafter, pure silica hydrogel can be shrunk by treatment with concentrated ammonium hydroxide solution to a somewhat greater degree than silica-metal oxide composite hydrogels.

If a silica-metal oxide hydrogel is used, the metal-oxide content should be such that the amount of metal oxide present in the ultimate dried material is less than about ten percent by weight.

The ease and degree of shrinkage of the hydrogel are somewhat dependent upon the pH of the hydrogel. Siliceous hydrogels of comparatively high pH are more easily shrunk than low pH hydrogels, and also exhibit a somewhat greater degree of volume reduction. When dealing with an acid hydrogel of low pH, it is, of course, preferable to use a more concentrated ammonia-containing fluid, e.g. a stronger ammonium hydroxide solution, say from 25 to 30% $NH_3$ by weight, since part of the $NH_4OH$ will be used up in simply neutralizing the acid hydrogel.

Our treatment with the ammonia-containing fluid is desirably carried out immediately after the formation of the hydrogel, or in any event, prior to the base exchanging thereof. After such treatment, the gel may be base exchanged with an acid, an ammonium salt, or a metal salt to remove the zeolitic sodium. By using a base exchange solution of a metal salt other than a metal already contained in the hydrogel, it is possible to introduce quantities of an additional metal oxide into the gel composite. The incorporation of such an additional metal oxide into the hydrogel may desirably act as a catalytic promoter under particular reaction conditions. The gel is then washed, dried, e.g. in air or in superheated steam, and calcined.

It is frequently desirable to increase the density of the thus-tempered gel. This is conveniently achieved by carefully heating the gel at a temperature slightly below its incipient sintering temperature until the gel reaches the desired density.

If desired, the initial hydrosol may be formed in such a manner as to produce catalyst beads, i.e. spheroidal particles. A number of methods for producing such catalyst beads have been described. See, for example, U.S. Patent 2,384,946 to Marisic. Broadly, such methods comprise introducing the hydrosol into a column of water-immiscible liquid. For example, the hydrosol is introduced into an oil medium whereby spheroidal globules of hydrosol are formed. These hydrosol globules subsequently set to a hydrogel and are then passed into an underlying layer of water from which they are sluiced to further processing operation, such as hydrothermal treatment, base exchange, water washing, drying, and calcining.

However, in accordance with another aspect of our invention, if the beads of hydrogel are treated, prior to such further processing operations such as hydrothermal treatment, base exchange, etc., with a concentrated ammonia-containing fluid, e.g. a strong aqueous ammonium hydroxide solution, considerable shrinkage occurs and, after base exchanging, washing, drying and tempering, a high pore volume, large diameter product is obtained. Further, the $NH_4OH$ treatment and resulting gel shrinkage considerably enhances the whole bead yield, a yield of 100% whole beads frequently being obtained.

In specifying the concentration of strong aqueous ammonium hydroxide solutions, it is preferable that the concentration be expressed in terms of weight percent ammonia in the solution. While pH is a measure of the alkalinity of the solution and hence of the $NH_3$ content, when dealing with strongly concentrated solutions, i.e. 10% $NH_3$ by weight or greater, it is difficult to determine the pH with a high degree of precision, whereas weight percent $NH_3$ permits a more accurate statement as to precise concentration.

The following examples will further illustrate our invention. All parts are by weight unless otherwise indicated.

EXAMPLES 1–3

These three examples illustrate the applicability of the method of our invention to silica hydrogels of varying pH. In each instance a silica sol was formed by combining a specified quantity of an aqueous solution containing 96.8 weight percent sulfuric acid with 672 grams of a silicate solution containing 50 weight percent commercial sodium silicate (28.7% $SiO_2$; $SiO_2/Na_2O=3.22$ weight ratio). The sol compositions and gel properties are tabulated below:

| | Example 1 | Example 2 | Example 3 |
|---|---|---|---|
| Sol Composition: | | | |
| 50% wt. N Brand Silicate Soln, g | 672 | 672 | 672 |
| 96.8% wt. $H_2SO_4$, g | 50 | 47 | 34.4 |
| Water, g | 400 | 403 | 415.6 |
| Total Weight, g | 1,122 | 1,122 | 1,122.0 |
| Gel Properties | | | |
| Temperature, °F | 72 | 53 | 52 |
| Gel Time, Seconds | 8 hrs. | 14 | 4 |
| pH | 2.8 | 7.3 | 9.9 |

The gels were broken into cubes and covered with a concentrated solution of ammonium hydroxide (28.9% wt. $NH_3$). After 24 hours soaking, the hydrogel of Example 1 shrank to 69% of its original volume, the hydrogel of Example 2 to 72% and that of Example 3 to 79%. The gels were washed free of soluble salts and dried in superheated steam at 250° F. After tempering for 5 hours at 400° F. in air, the gels had the following properties:

| | Example 1 | Example 2 | Example 3 |
|---|---|---|---|
| Surface Area, sq. ml/g | 110 | 90 | 137 |
| Pore Vol., cc./g | 1.76 | 1.45 | 0.90 |
| Avg. Pore Dia., A | 639 | 644 | 262 |
| Particle Dens., g./cc | 0.44 | 0.52 | 0.74 |

EXAMPLES 4–15

These examples illustrate the effect of the temperature during the ammonium hydroxide treatment upon the shrinkage of the hydrogel and upon the density of the final gel.

A silica sol was formed by combining 3200 ml. of an aqueous solution containing 452 g. of 96.4% wt. sulfuric acid and 6400 g. of silicate solution containing 50% wt. of commercial sodium silicate (28.7% $SiO_2$; $SiO_2/Na_2O$=3.22 weight ratio). The solutions were cooled to 34° F. before mixing. The resulting sol had a pH of 6.7 and a gel time of 55 seconds. The gel was broken into cubes and treated with an ammonium hydroxide solution (28.6% wt. $NH_3$) for various times at different temperatures. The gels were then base exchanged with ammonium sulfate solution, washed, dried and tempered 5 hours at 400° F. in air. The results are tabulated below:

| Example No. | Ammonium Hydroxide Treatment | | Percent Vol. Shrinkage During Ammonium Hydroxide Treatment | Particle Dens. of Tempered Gel, g./cc. |
|---|---|---|---|---|
| | Time, Hrs. | Temp., ° F. | | |
| 4 | 6 | 35 | 34 | 0.60 |
| 5 | 2 | Room Temp | 42 | 0.54 |
| 6 | 6 | do | 64 | 0.43 |
| 7 | 24 | do | 78 | 0.73 |
| 8 | 6 | 142 | 47 | 0.56 |
| 9 | 1 | Room Temp | 32 | |
| 10 | 2½ | do | 44 | |
| 11 | 3½ | do | 52 | |
| 12 | 8 | do | 64 | |
| 13 | 10 | do | 68 | |
| 14 | 15 | do | 72 | |
| 15 | 24 | do | 78 | 0.73 |

The above data show that shrinkage is more rapid at room temperature than at 35° F. However, at 142° F. considerable ammonia had been lost. The time of treatment ranges from one hour to 24 hours. Although additional time is not objectionable, little further shrinkage results therefrom.

EXAMPLES 16–18

These examples illustrate the effect of subsequent processing of a hydrogel after treatment with concentrated $NH_4OH$ solution upon the particle density of the final gel. A siliceous hydrogel was prepared as described in Examples 4–15, was broken into cubes and treated for 6 hours with an ammonium hydroxide solution (28.6 weight percent $NH_3$) as described in Example 6, and was then divided into three portions, each of which was wet processed in a different manner. The gels were then washed, dried, and tempered as described in Examples 4–15. The wet processing base exchange conditions and final particle densities are tabulated as follows:

| Example No. | Base Exchange Conditions | Particle Dens. of Tempered Gel. g./cc. |
|---|---|---|
| 16 | 9–2 hr., 10% wt. $(NH_4)_2SO_4$ | 0.43 |
| 17 | 9–2 hr., 5% wt. $H_2SO_4$ | 0.47 |
| 18 | None | 0.57 |

EXAMPLES 19–20

These examples illustrate the effect of calcining at various temperatures upon the final properties of the gel. Silica bead hydrogel was formed by combining 352 milliliters per minute of a sodium silicate solution containing 66.7 weight percent commercial silicate and 350 milliliters per minute of a sulfuric acid solution containing 10.3 weight percent $H_2SO_4$ in a mixing nozzle. The sol had a temperature of 88° F., a pH of 7.0, and a gel time of 2.8 seconds. The sol was flowed over a fluted cone to divide the stream into several smaller streams, and was then passed into oil in a bead forming tower.

The bead hydrogel thus formed in the tower was divided into two parts. Each part was treated for 24 hours in ammonium hydroxide (28.6% wt. $NH_3$) at room temperature, base exchanged with 2% wt. ammonium sulfate solution, dried and calcined, one part at 400° F., the other at 1000° F. The products had 100% whole beads.

| | Example 19 | Example 20 |
|---|---|---|
| | Calcined 5 hrs. at 400° F. in air | Calcined 3 hrs. at 1000° F. in air |
| Particle Dens., g./cc. | 0.69 | 0.70 |
| Real Density, g./cc. | 2.16 | 2.20 |
| Pore Vol., cc./g. | 0.99 | 0.98 |
| Surface Area, sq. m./g. | 67 | 63 |
| Avg. Pore Dia., Ang. | 590 | 620 |

EXAMPLE 21

This example illustrates the method of our invention carried out under a positive pressure of ammonia gas. Silica bead hydrogel was formed by the method described in the first paragraph of Examples 19–20. The bead hydrogel was placed in a steel bomb and covered with ammonium hydroxide solution (28.1% wt. $NH_3$). The bomb was then pressured with ammonia gas to 200 p.s.i.g. The gel was treated for 22 hours, during which time the pressure gradually decreased to 178 p.s.i.g. The gel shrank 55% during this treatment. After base exchanging with ammonium sulfate, washing, drying and tempering at 400° F., the gel had a particle density of 0.56 g./cc.

EXAMPLE 22

This example illustrates the degree of shrinkage obtained using a high pH silica hydrogel. A high pH silica sol was prepared by combining 350 ml./min. of a sodium silicate solution (14.4% wt. $SiO_2$, 4.45% wt. $Na_2O$) and 350 ml./min. of an acid-salt solution, containing 2.84% wt. $H_2SO_4$ and 12.5% wt. sodium chloride, in a mixing nozzle. The sol had a temperature of 44° F., a pH of 10.9, and a gel time of 2.2 seconds. The sol was formed into bead hydrogel and was treated with ammonium hydroxide (28.6% wt. $NH_3$).

| Time of $NH_4OH$ treatment, hrs. | Percent vol. shrinkage of hydrogel |
|---|---|
| ¼ | 24 |
| ½ | 42 |
| 1 | 60 |
| 18 | 83 |

A sample of hydrogel, after 18 hours of ammonium hydroxide treatment, was ion exchanged with nine 2-hour applications of 10% wt. ammonium sulfate solution, washed, dried at 250° F. in steam, and calcined for 5 hours at 400° F. in air. The resulting product had a particle density of 0.98 cc./g.

EXAMPLE 23

This example illustrates the method of our invention as applied to a composite silica-alumina hydrogel. A silica-alumina sol (about 1% $Al_2O_3$ on dry basis) was prepared by combining 374 ml./min. of a solution containing 9.1% wt. $H_2SO_4$ and 0.92% wt. $Al_2(SO_4)_3$ with 349 ml./min. of a sodium silicate solution (containing 66.5% wt. commercial sodium silicate) in a mixing nozzle. The sol had a temperature of 60° F., a pH of 7.1, and a gel time of 3.1 seconds. The sol was formed into bead hydrogel in a forming tower. This bead hydrogel was then treated with ammonium hydroxide solution (28.9% wt. $NH_3$). After 90 hours of treatment at room temperature, the gel shrank 70%. After washing, drying, and calcining 5 hours at 400° F., a product was obtained with a 100% whole bead yield and a particle density of 0.72 g./cc.

EXAMPLES 24–27

These examples illustrate the effect of the $NH_3$ concentration of the treating solution upon the shrinkage of the hydrogel and upon the final properties of the tempered gel. A 7 pH silica hydrogel was prepared as described in Examples 19–20. The gel was separated into four parts and then treated with ammonium hydroxide solution of different concentrations for 24 hours at room temperature. The results are shown in Table I. It is evident that it is necessary to treat the gel with solutions of at least 10% by weight $NH_3$, to obtain a substantial shrinkage of gel and hard, unbroken beads after drying.

EXAMPLES 28–32

These examples illustrate the effect of the time of treatment with concentrated $NH_4OH$ solution upon the shrinkage of the hydrogel and upon the final properties of the tempered gel. A silica hydrogel of pH 7 was prepared as described in Examples 19–20. The hydrogel was separated into five parts and then treated with ammonium hydroxide solution (30 weight percent $NH_3$) for varying times. The data are presented in Table I and in graphical form in the drawing. It will be seen that the treatment preferably should be carried out for at least two hours when conducted at about 70° F., the maximum time depending on the surface area and porosity desired in the finished product. In general, treatment at higher temperatures should be for shorter times and at lower temperatures should be for longer times in order to obtain equivalent results.

*Table I*

AMMONIUM HYDROXIDE TREATED SILICA HYDROGEL

| Example No. | $NH_4OH$ Conc., Percent wt. $NH_3$ | Treat Time, Hrs. | Gel Shrinkage, Percent | Properties after Calcining 5 Hrs. @ 400° F. | | | | Avg. Pore Dia., A | Crush Strength,[1] lbs. | Whole Beads, Percent Wt. |
|---|---|---|---|---|---|---|---|---|---|---|
| | | | | Part. Dens., g./cc. | Real Dens., g./cc. | Pore Vol., cc./g. | Surface Area, sq. m./g. | | | |
| 24 | 0 | 24 | 9 | 0.720 | 2.07 | 0.912 | 431 | 85 | 13 | Fractured. |
| 25 | 5 | 24 | 7 | 0.680 | 2.10 | 0.992 | 325 | 122 | 16 | Do. |
| 26 | 10 | 24 | 29 | 0.607 | 2.09 | 1.16 | 215 | 216 | 12 | Do. |
| 27 | 30 | 24 | 74 | 0.671 | 2.11 | 1.01 | 125 | 323 | 17 | 100. |
| 28 | 30 | 2 | 39 | 0.543 | 2.07 | 1.37 | 228 | 250 | 8.6 | Fractured. |
| 29 | 30 | 10 | 60 | 0.460 | 2.09 | 1.69 | 173 | 391 | 4.4 | Do. |
| 30 | 30 | 50 | 66 | 0.880 | 2.10 | 0.657 | 133 | 198 | 20 | 100. |
| 31 | 30 | 24 | 78 | 0.58 | 2.10 | 1.25 | 126 | 397 | 16 | 100. |
| 32 | 30 | 168 | 86 | 1.06 | 2.10 | 0.47 | 134 | 140 | 24 | 100. |

[1] After calcining 3 hours at 1000° F. ⅜Force required to crush 5 to 6 mesh particles.

Time of treatment has an unusual effect on density. The data in Table I show that particle density first decreases and then increases as treating time is increased.

The following examples show the applicability of our invention to various silica-metal oxide hydrogels.

EXAMPLE 33

A silica-magnesia sol was prepared by mixing 573 ml. of sodium silicate solution (14.4% wt. $SiO_2$, 4.45% wt. $Na_2O$), 219 ml. of an 18.6% wt. $H_2SO_4$ solution, and 52 ml. of a 46.6% wt. $MgSO_4.7H_2O$ solution. The resulting sol had a temperature of 58° F., a pH of 6.1, and a gel time of 75 seconds. The resulting gel was cut into cubes and treated with ammonium hydroxide (28.6% wt. $NH_3$) for 24 hours at about 85° F. The hydrogel lost 46% of its original volume in this treatment. The gel was then washed, dried in an oven at 200–250° F., and calcined for 5 hours at 400° F. in air. The calcined product had a particle density of 0.87 g./cc. and a calculated MgO content of 5% wt.

EXAMPLE 34

A silica-zirconia sol was prepared by mixing 573 ml. of sodium silicate solution (14.4% wt. $SiO_2$, 4.45% wt. $Na_2O$), 214 ml. of an 16.1% wt. $H_2SO_4$ solution, and 40 ml. of a zirconium sulfate solution (containing equivalent of 5 g. $ZrO_2$). The resulting sol had a temperature of 54° F., a pH of 4.1, and a gel time of 90 minutes. The gel was treated with ammonium hydroxide solution (28.6% wt. $NH_3$) for 24 hours at about 84° F. The gel lost 64% of its original volume in this treatment. The gel was then washed, dried in an oven at 200–250° F., and calcined for 5 hours at 400° F. The calcined product had a particle density of 0.71 g./cc. and a calculated $ZrO_2$ content of 5% wt.

Variations can of course be made without departing from the spirit of our invention.

Having thus described our invention, what we desire to secure and hereby claim in Letters Patent is:

1. A method of partially dehydrating and reducing the volume of a siliceous hydrogel comprising treating said hydrogel, after its formation and prior to drying, with an aqueous solution of ammonium hydroxide containing at least 10% ammonia on a weight basis for a peirod of at least one half an hour at a temperature of from about 30° F. up to the boiling point of the ammonium hydroxide solution to thereby shrink the hydrogel.

2. The method of claim 1 wherein the hydrogel is a composite silica-metal oxide hydrogel.

3. A method of partially dehydrating and reducing the volume of a siliceous hydrogel comprising treating said hydrogel, after its formation and prior to drying, with a concentrated aqueous ammonium hydroxide solution containing at least 10% ammonia on a weight basis, said treatment carried out in the presence of an ammonia-containing gas under a positive pressure of from about zero to 500 pounds per square inch at a temperature of from about 30° F. up to the boiling point of the ammonium hydroxide solution for at least one half hour, to thereby shrink said hydrogel.

4. The method of claim 3 wherein said siliceous hydrogel is a composite silica-metal oxide hydrogel.

5. In a method of preparing a solid, porous silica-containing material having improved strength, high pore volume, and large pores, this method comprising forming a siliceous hydrogel, base exchanging the hydrogel to remove zeolitic alkali therefrom, washing, and drying, the step of treating said hydrogel after its formation and prior to base exchanging with a concentrated aqueous ammonium hydroxide solution containing at least 10% ammonia on a weight basis for a period of at least one half an hour at a temperature of from about 30° F. up to the boiling point of the ammonium hydroxide solution, to thereby shrink said hydrogel.

6. The method of claim 5 wherein the ammonium hydroxide treatment is carried out in the presence of an ammonia-containing gas under a positive pressure of from about zero to 500 pounds per square inch.

7. A method of partially dehydrating and reducing the volume of a siliceous hydrogel comprising subjecting said hydrogel, after its formation and prior to drying, to continuous treatment with an ammonia-containing fluid at a temperature of at least 30° F. for a time sufficient to cause the concentration of ammonia within the aqueous phase of said hydrogel to reach at least ten percent by weight, to thereby shrink said hydrogel.

References Cited in the file of this patent

UNITED STATES PATENTS

| | | |
|---|---|---|
| 1,819,354 | Behrman | Aug. 18, 1931 |
| 2,484,258 | Webb et al. | Oct. 11, 1949 |
| 2,699,376 | Hay | Jan. 11, 1955 |